United States Patent [19]
Moriwake

[11] Patent Number: 5,353,068
[45] Date of Patent: Oct. 4, 1994

[54] VIDEO SIGNAL COMBINING APPARATUS AND METHOD

[75] Inventor: Katsuakira Moriwake, Kanagawa, Japan

[73] Assignee: Sony Corporation, Tokyo, Japan

[21] Appl. No.: 107,062

[22] Filed: Aug. 17, 1993

[30] Foreign Application Priority Data

Aug. 31, 1992 [JP] Japan .................................. 4-255983

[51] Int. Cl.⁵ ...................... H04N 5/272; H04N 5/265
[52] U.S. Cl. ...................................... 348/585; 348/590
[58] Field of Search ................. 358/181, 183, 182, 22, 358/22 CK; 348/578, 584, 585, 586, 598, 590; H04N 5/272, 5/265

[56] References Cited

U.S. PATENT DOCUMENTS

| | | | |
|---|---|---|---|
| 4,774,583 | 9/1988 | Keller et al. | 358/183 |
| 4,851,912 | 6/1989 | Jacksen et al. | 358/183 |
| 5,027,213 | 6/1991 | Kamin | 358/183 |
| 5,077,608 | 12/1991 | Dubner | 358/183 |
| 5,214,512 | 5/1993 | Freeman | 358/183 |

FOREIGN PATENT DOCUMENTS

| | | |
|---|---|---|
| 199489 | 10/1986 | European Pat. Off. |
| 269998 | 9/1987 | European Pat. Off. |
| 2063616 | 6/1981 | United Kingdom |

Primary Examiner—Victor R. Kostak
Assistant Examiner—Nathan J. Flynn
Attorney, Agent, or Firm—Lewis H. Eslinger; Jay H. Maioli

[57] ABSTRACT

A video signal combining apparatus for combining at least three video signals ($V_A$, $V_B$, $V_C$) including a key signal ($K_A$, $K_B$, $K_C$) and depth signal ($Z_A$, $Z_B$, $Z_C$) includes at least two cascade-connected 2-input combiners (1, 2) which combine two of the video signals so that the output of a preceding stage becomes one input of the next stage; a decision circuit (3) which decides on a pixel by pixel basis on an order of arrangement in a depth direction among images from the depth signal of the input video signals; and a switching circuit (4) which rearranges the input video signals in an order of arrangement based on the result of decision of the decision circuit (3) and outputs the result in a parallel manner to the inputs of the above-described combiners (1, 2) so that the video signals are sequentially combined in the decided order of arrangement.

4 Claims, 5 Drawing Sheets

VIDEO SIGNAL COMBINING APPARATUS AND METHOD

BACKGROUND OF THE INVENTION

1. Field of the Invention

This invention relates to a video signal combining apparatus and method for combining three or more video signals.

2. Description of the Prior Art

As a video signal combining apparatus which obtains an apparently three-dimensional video signal by combining a plurality of two-dimensional video signals, it is known to provide a DME (digital multieffector).

FIG. 2 of the accompanying drawings shows the fundamental structure of a conventional 3-channel DME combiner for obtaining a three-dimensional video image by combining three video signals.

This 3-channel DME combiner is constituted by having two, a first and second, 2-channel combiners 1 and 2 so-called cascade-connected, i.e. first having two video signals $DME_1$ and $DME_2$ combined by the first 2-channel combiner 1 and then having this combined video signal $DME_{12}$ and the remaining video signal $DME_3$ combined by the second 2-channel combiner 2, thereby obtaining a desired combined video signal $DME_{123}$.

In such a structure, the video signals input to the first and second 2-channel combiners 1 and 2 comprise a video signal V, a key signal K, and a depth signal Z. By appropriately combining the key signal K and the depth signal Z by a desired value, it is possible to make the edge of the combined video image and an intersecting region non jagged and smooth.

Here, the basic edge processing in the combining operation of the 2-channel combiner will be explained using FIG. 3 of the accompanying drawings and taking as an example the case where two planes A and B intersect. Note that, in the figure, BG denotes a background; a an edge of a region in which a plane A exists on a plane B; b an edge of a region in which the plane B exists on the plane A; c an edge of a region in which the plane A exists on the background; and d an intersecting region between the plane A and the plane B.

Edge a; As shown in the following equation (1), video signals $V_A$ and $V_B$ are mixed using a key signal $K_A$ of the A input:

$$K_A \cdot V_1 + (1-K_A) \cdot V_B \quad (1)$$

(where, $0 \leq K_A \leq 1$)

Edge b: As shown in the Following equation (2), video signals $V_A$ and $V_B$ are mixed using a key signal $K_B$ of the B input:

$$K_B \cdot V_B + (1-K_B) \cdot V_A \quad (2)$$

(where, $0 \leq K_B \leq 1$)

Edge c: As shown in the following equation (3), a picture F and a background BG are mixed using a combined key signal $K_{BG}$ of the key signals $K_A$ and $K_B$:

$$K_{BG} \cdot V_F + (1-K_{BG}) \cdot V_{BG} \quad (3)$$

$$K_{BG} = 1 - (1-K_A)(1-K_B)$$

Intersecting region d: A priority signal $Z_{AB}$, which is one type of key signal, is produced using the depth signals $Z_A$ and $Z_B$, and video signals $V_A$ and $V_B$ are mixed as shown in the following equation (4):

$$Z_{AB} \cdot V_A + (1-Z_{AB}) \cdot V_B \quad (4)$$

The 2-channel combiner obtains a combined video image having a smooth edge and intersecting region by performing the above processing.

However, the conventional B-channel DME combiner comprising two cascade-connected 2-channel combiners having the above-described Function suffers From the problem that a smooth edge cannot be obtained on the basis of the order of combination of the video signals corresponding to the images to be combined without account being taken of the depth relationships of the images. This results in unnatural edges of a step-like form.

A more detailed description will be given below regarding this problem.

Note that, here, For simplification of the explanation, a case where three plane images of A, B, and C are superimposed in an order of A, B, and C from the top, as shown in FIG. 4 of the accompanying drawings, will be explained using FIG. 5 and FIG. 6 of the accompanying drawings.

As shown in FIG. 5(a), in a case where after the video signal $DME_A$ of the image A and the video signal $DME_B$ of the image B are combined, the combined video signal $DME_{AB}$ and the video signal $DME_C$ of the image C are combined, that is, where the signals are combined in an order of depth, in the combined video image AB of A and B, A and B are mixed by the key signal K, so that the edge of A is smooth.

Then, even in a case where the combined image AB and the image C are combined, B and C are mixed by the key signal K, so that the edge of B becomes smooth.

Contrary to this, as shown in FIG. 5(b), in a case where after the video signal $DME_A$ of the image A and the video signal $DME_C$ of the C are combined, the combined video signal $DME_{AC}$ and the video signal $DME_B$ of the image B positioned in the middle of the two images A and C are combined, the edge of B becomes smooth since B and C are mixed by the key signal K, but the edge of A exhibits jaggedness since an appropriate key signal does not exist.

Specifically, the image A and the image C are combined in advance, so the picture of C which should not be seen in the edge part of A appears as shown in FIG. 6(a).

On way to avoid the appearance of picture C would be not to combine the images A and C, but in this case, as shown in FIG. 6(b), the edge exhibits jaggedness.

This problem can be avoided if the combination is performed from the highest (or lowest) order in the order or arrangement (depth), but unlike in the case of a switcher, in the case of a DME combiner, generally the order of arrangement of pictures varies for each pixel and is not uniform at all positions in the picture plane, and therefore the above-described problem cannot be simply solved.

Also, in a case where the image A is semi-transparent and the image B is opaque, a problem similar to that mentioned above occurs. Namely, when the image A and the image C are combined in advance, A and C are mixed, and the picture of C which should be invisible since B is opaque is sometimes seen.

An example of the type of video signal combining circuit described above is shown in U.S. Pat. No. 4,851,912 (The Grass Valley Group Inc.)

SUMMARY OF THE INVENTION

This invention has as an object to provide a video signal combining apparatus which can give a smooth edge and intersecting region when three or more video signals are combined and, in addition, can give a video image in which an unnatural picture is not seen.

Viewed from one aspect this invention provides an apparatus for combining input video signals, each video signal having an associated depth information signal, said apparatus comprising:

(i) first combining means for combining a first video signal with a second video signal and outputting an intermediate combined video signal;

(ii) second combining means for combining said intermediate combined video signal supplied from said first combining means with a third video signal and outputting an output combined video signal;

(iii) discriminating means for discriminating a depth order. of said input video signals in accordance with said depth information signals; and (iv) switching means supplied with said input video signals for switching which ones of said input video signals form said first video signal, said second video signal and said third video signal respectively according to a discrimination result of said discriminating means so that said video signals are switched to form said First video signal, said second video signal and said third video signal in depth order.

Thus, at least preferred embodiments provide: at least two cascade-connected 2-input combiners which combine two video signals so that the output of a stage becomes one input of the next stage; a judgement circuit which decides for each pixel on an order of arrangement in a depth direction among the image from the depth signal of the input video signals; and a switching circuit which rearranges the input video signals in an order of the arrangement based on the result of decision of the decision circuit and outputs the result in a parallel manner to the inputs of the above-described combiners, whereby at least three video signals are combined.

Viewed from another aspect this invention provides a method of combining at least three input video signals, each video signal having an associated depth signal, said method comprising the steps of:

(i) deciding an order of depth arrangement for each pixel of the input video signals in accordance with said depth signals; and (ii) sequentially combining the input video signals for that pixel in accordance with said order of depth.

Thus, in at least preferred embodiments, at least three video signals are combined by deciding on an order of arrangement in a depth direction among the images for each pixel from the depth signal of the input video signals and sequentially combining the video signals in the decided order of arrangement.

BRIEF DESCRIPTION OF THE DRAWINGS

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
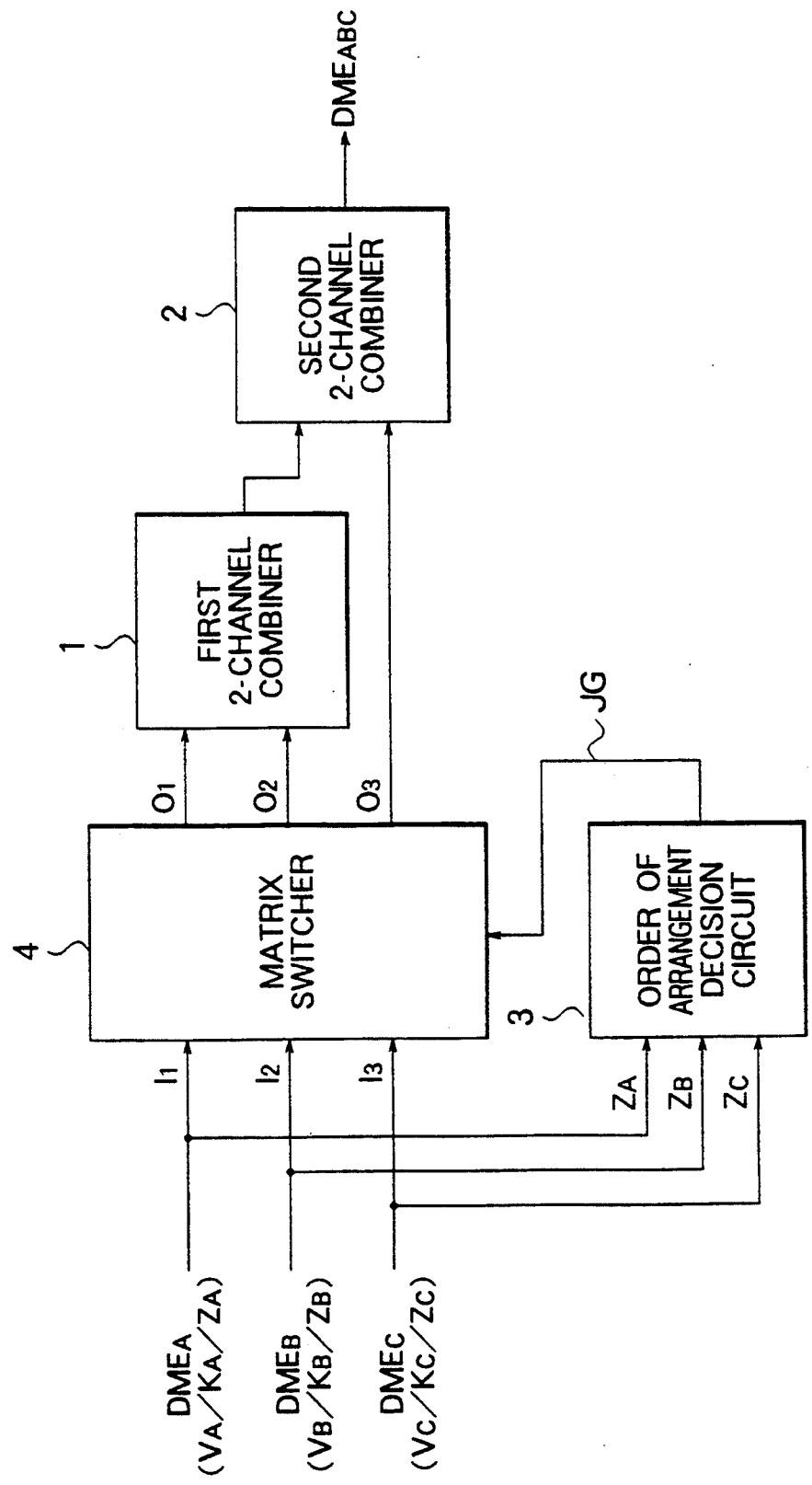
FIG. 1 shows a structural view of one embodiment of a 3-channel DME combiner.
Figure 2:
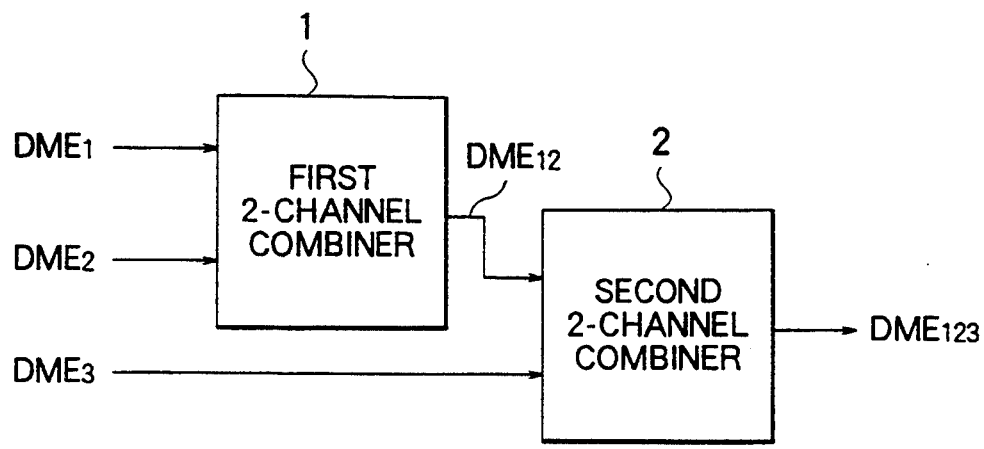
FIG. 2 shows a structure view of a conventional 3-channel DME combiner.
Figure 3:
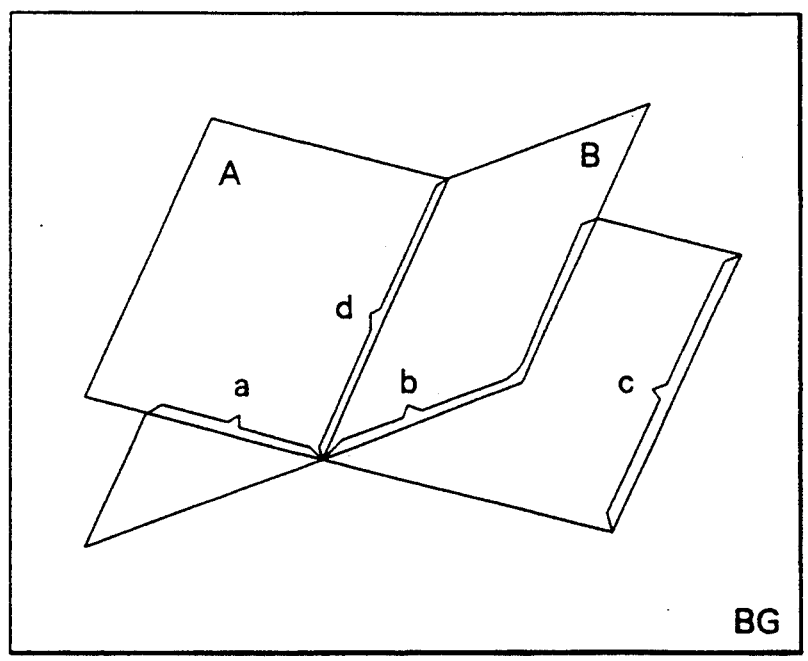
FIG. 3 is a view for explaining basic edge processing in a combining operation of a 2-channel combiner where two planes intersect.
Figure 4A:
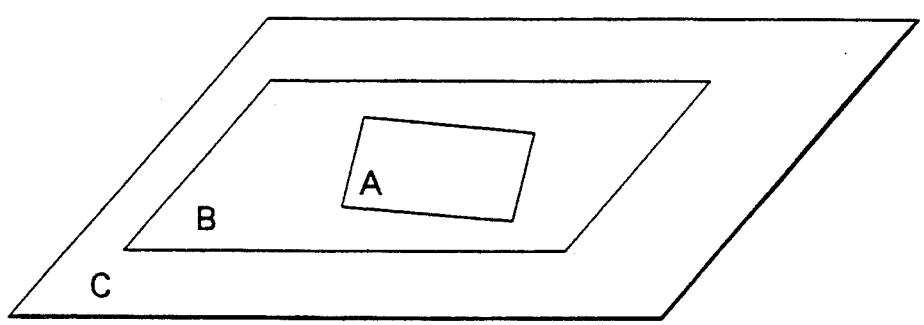
FIGS. 4a and 4b a view showing an example of an arrangement of three images.
Figure 4B:
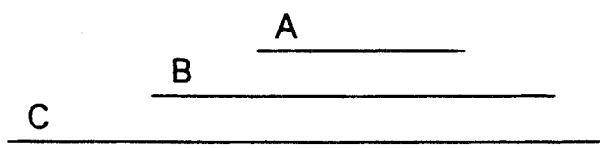
Figure 5A:
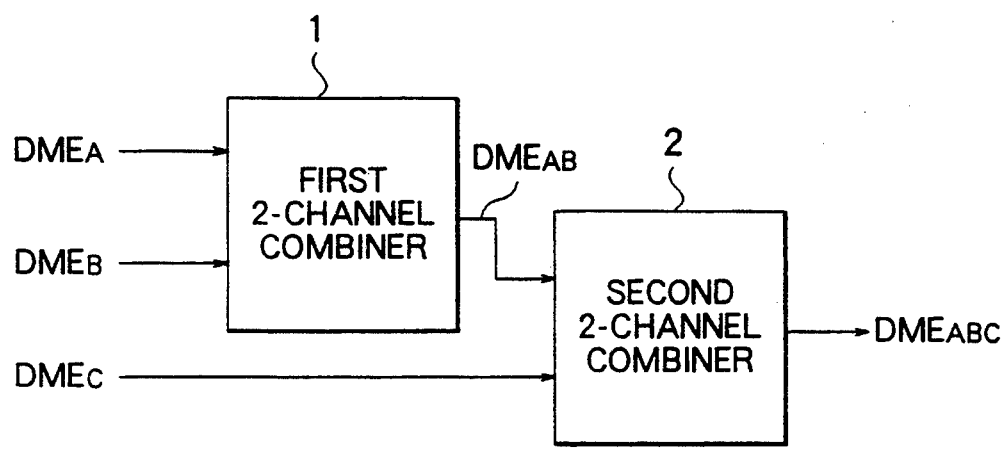
FIGS. 5a and 5b a view showing an example of the order of combination of video signals of three images.
Figure 5B:
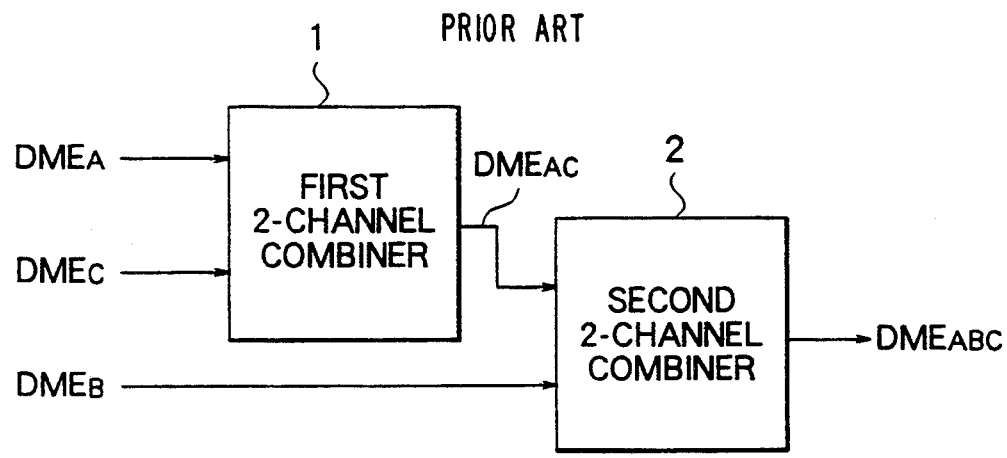
Figure 6A:
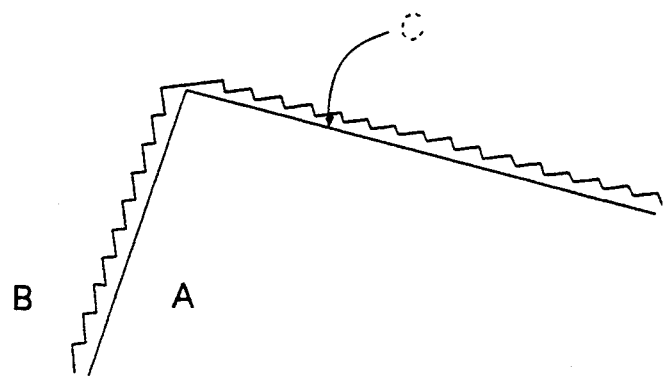
FIGS. 6a and 6b a view for explaining a problem that occurs with the conventional 3-channel DME combiner
Figure 6B:
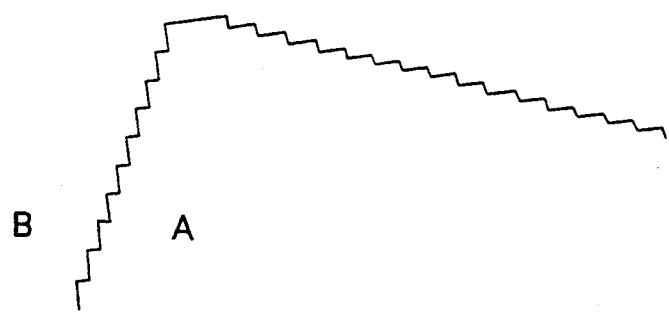

FIG. 1 is a structural view showing one embodiment of a 3-channel DME combiner in which the same constituent parts as those in FIG. 5 showing the conventional example are represented by the same references.

$DME_A$, $DME_B$ and $DME_C$ denote the input video signals; 1 a first 2-channel combiner; 2 a second 2-channel combiner; 3 an order of arrangement decision circuit; and 4 a matrix switcher serving as the switching circuit.

The input video signals $DME_A$, $DME_B$, and $DME_C$ are constituted by video signals $V_A$, $V_B$, and $V_C$; key signal $K_A$, $K_B$, and $K_C$; and depth signals $Z_A$, $Z_B$, and $Z_C$, respectively.

The order of arrangement decision circuit 3 decides on the order of arrangement in the depth direction, that is, the preceding and succeeding direction or vertical direction, among the images A, B, and C for each pixel, from the depth signals $Z_A$, $Z_B$, and $Z_C$ in the three input video signals $DME_A$, $DME_B$, and $DME_C$ and outputs a decision signal JG indicating the result of decision to the matrix switcher 4.

The matrix switcher has three input terminals $I_1$, $I_2$, and $I_3$ and output terminals $O_1$, $O_2$, and $O_3$ and switches the connection configuration between the input terminals $I_1$, $I_2$, and $I_3$ and the output terminals $O_1$, $O_2$, and $O_3$, in accordance with the contents of the decision signal JG from the order of arrangement decision circuit 3.

Also, the output terminals $O_1$ and $O_2$ are connected to two input terminals of the first 2-channel combiner 1, respectively, the output terminal $O_3$ being connected to one of the input terminals of the second -channel combiner, and the output terminal of the first 2-channel combiner i being connected to the other input terminal of the second 2-channel combiner 2.

TABLE 1

| |
| --- |
| When $Z_A \leq Z_B \leq Z_C$, $I_1 \to O_1$, $I_2 \to O_2$, $I_3 \to O_3$ |
| When $Z_A \leq Z_C \leq Z_B$, $I_1 \to O_1$, $I_3 \to O_2$, $I_2 \to O_3$ |
| When $Z_B \leq Z_A \leq Z_C$, $I_2 \to O_1$, $I_1 \to O_2$, $I_3 \to O_3$ |
| When $Z_B \leq Z_C \leq Z_A$, $I_1 \to O_1$, $I_3 \to O_2$, $I_2 \to O_3$ |
| When $Z_C \leq Z_A \leq Z_B$, $I_2 \to O_1$, $I_1 \to O_2$, $I_3 \to O_3$ |
| When $Z_C \leq Z_B \leq Z_A$, $I_1 \to O_1$, $I_2 \to O_2$, $I_3 \to O_3$ |

Namely, where the depths of the images A, B, and C become larger in an Order OF C, B and A, connections are made From the input terminal $I_1$ to the output terminal $O_1$, the input terminal $I_2$ to the output terminal $O_2$, and the input terminal $I_3$ to the output terminal $O_3$.

At this time, the video signals $DME_A$ and $DME_B$ are input to the first 2-channel combiner 1, and the combined video signal $DME_{AB}$ and the video signal $DME_C$ are then input to the second 2-channel combiner 2.

Where the depths of the images A, B, and C become larger in an order of B, C, and A, connection is made from the input terminal $I_1$ to the output terminal $O_1$, the input terminal $I_3$ to the output terminal $O_2$, and the input terminal $I_2$ to the output terminal $O_3$.

At this time, the video signals $DME_A$ and $DME_C$ are input to the First 2-channel combiner 1, and the combined video signal $DME_{AC}$ and the video signal $DME_B$ are then input to the second 2-channel combiner 2.

Where the depths of the images A, B, and C become larger in an Order of C, A, and B, connection is made from the input terminal $I_2$ to the output terminal $O_1$, the input terminal $I_1$ to the output terminal $O_2$, and the input terminal $I_3$ to the output terminal $O_3$.

At this time, the video signals $DME_B$ and $DME_A$ are input to the first 2-channel combiner 1, and the combined video signal $DME_{BA}$ and the video signal $DME_c$ are then input to the second 2-channel combiner 2.

Where the depths of the images A, B, and C become larger in an order of A, C, and B, connection is made from the input terminal $I_1$ to the output terminal $O_1$, the input terminal $I_3$ to the output terminal $O_2$, and the input terminal $I_2$ to the output terminal $O_3$.

At this time, the video signals $DME_A$ and $DME_C$ are input to the first 2-channel combiner 1. and the combined video signal $DME_{AC}$ and the video signal $DME_B$ are then input to the second 2-channel combiner 2.

Where the depths of the images A, B, and C become larger in an order of B, A, and C, connection is made from the input terminal $I_2$ to the output terminal $O_1$, the input terminal $I_1$ to the output terminal $O_2$, and the input terminal $I_3$ to the output terminal $O_3$.

At this time, the video signals $DME_B$ and $DME_A$ are input to the first 2-channel combiner 1, and the combined video signal $DME_{BA}$ and the video signal $DME_C$ are then input to the second 2-channel combiner 2.

Where the depths of the images A, B, and C become larger in an order of A, B, and C, connection is made from the input terminal $I_1$ to the output terminal $O_1$, the input terminal $I_2$ to the output terminal $O_2$, and the input terminal $I_3$ to the output terminal $O_3$.

At this time, the video signals $DME_A$ and $DME_B$ are input to the first 2-channel combiner 1, and the combined video signal $DME_{AB}$ and the video signal $DME_C$ are then input to the second 2-channel combiner 2.

Next, the operation by the above-described structure will be explained.

The video signals $DME_A$, $DME_B$, and $DME_C$ which are input to three input ports CH1, CH2, and CH3 (not shown) of the 3-channel DME combiner are input to the matrix switcher 4 via the input terminals $I_1$, $I_2$, and $I_3$, respectively. At the same time, the depth signals $Z_A$, $Z_B$, and $Z_C$ of the respective video signals $DME_A$, $DME_B$, and $DME_C$ are input to the order of arrangement decision circuit 3.

In the order of arrangement decision circuit 3, the order of arrangement for each pixel in the depth direction among the respective images A, B, and C. that is, in the horizontal direction or the vertical direction, is decided from the input depth signals $Z_A$, $Z_B$, and $Z_C$, and a decision signal JG indicating the result of decision is produced and output to the matrix switcher 4.

The matrix switcher 4, in accordance with the relationship of the order of arrangement shown by the input decision signal JG, controls the switching of connections between the input terminals $I_1$, $I_2$, and $I_3$ and the output terminals $O_1$, $O_2$, and $O_3$.

For example, where the relationship of the order of arrangement shown by the decision signal JG is $Z_a \leq Z_C \leq Z_B$, that is, where the degree of depth is in an order of the images of B, C, and A, and the B and C and the C and A ape adjacent to each other in the depth direction, the input terminal $I_1$ is connected to the output terminal $O_1$, the input terminal $I_3$, is connected to the output terminal $O_2$, and the input terminal $I_2$ is connected to the output terminal $O_3$.

By this, the video signals $DME_A$ and $DME_C$ are input to the first 2-channel combiner 1 and the video signal $DME_B$ is input to one input terminal of the second 2-channel combiner 2.

In the first 2-channel combiner 1, the mixing processing of the video signals $V_A$ and $V_C$ is carried out so that the edge or intersecting region becomes smooth using the key signals $K_A$ and $K_C$ and the depth signals $Z_A$ and $Z_C$ of the input video signals $DME_A$ and $DME_B$. This mixed and combined video signal $DME_{AC}$ (intermediate combined video signal) is output to the other input terminal of the second 2-channel combiner 2.

In the second 2-channel combiner 2, the output combined video signal $DME_{AC}$ of the First 2-channel combiner 1 and the video signal $DME_B$ output from the output terminal $O_3$ of the matrix switcher 4 are mixed by the same processing using the key signal $K_B$ etc., as mentioned above. At this time, the mixing processing using the key signal is carried out for the image C and image B, and therefore they may be obtained as smooth combined images without generating jaggedness in the edge or intersecting region, and the combined video signal $DME_{ABC}$ (output combined video signal) indicating a three-dimensional video image obtained by the combination of three images A, B, and C is output.

Also, in this combined image, even in a case where the image A is semi-transparent and the image C is opaque, the result will not be an unnatural video image where bits of the image B which should not be seen, since the image C being opaque is in fact seen.

As explained above, according to the present embodiment, the constitution is made so that the order of arrangement in the depth direction, that is, in the horizontal direction or the vertical direction, is decided for each of the images of the input video images, and the combination is sequentially carried out according to the order of arrangement, and therefore where three video signals are combined, a smooth edge and intersecting region can be obtained and a video image in which an unnatural picture is not seen can be obtained.

It is of note that, in the above, a description is given of an embodiment where three video signals are to be combined, but this invention can also be applied in cases where four or more video signals are to be combined, and a similar effect to the effect mentioned above can be naturally obtained by sequentially combining them in the decided order of arrangement. In this case, the number of input/output terminals I and O of the matrix switcher 4 and the number 2-channel combiners are appropriately increased in accordance with the number of the video signals to be combined.

In summary, three input video signals $DME_A$, $DME_B$, and $DME_C$ are input to the switching circuit of the video signal combining apparatus. At the same time, the depth signal of the video signals is input to the Judgement circuit.

In the judgement circuit, the order of arrangement in the depth direction among the images is decided for each pixel from the input depth signal, and this decision result is output to the switching circuit.

In the switching circuit, the input video signals are rearranged according to the order of arrangement in accordance with the result of the input decision. For example, the video signals $DME_A$ and $DME_B$ of the image A and image B which are at positions adjacent to each other are output to the first stage combiner, and the video signal $DME_C$ of the image C which exists at the position adjacent to the image B is output to the second stage combiner.

In the first stage combiner, the mixing processing of the two images is carried out so that the edge or intersecting region becomes smooth using the key signal and depth signal of the input video signals $DME_A$ and $DME_B$. This mixed and combined video signal $DME_{AB}$ is output to the second stage combiner.

In the second stage combiner, the combined video signal $DME_{AB}$ output from the first stage combiner and the video signal $DME_C$ output from the switching circuit are mixed by similar processing using the key signal etc. as mentioned above.

At this time, mixing processing using the key signal and depth signal is carried out for the image B and the image C, and thus there is obtained a smooth combined image without generation of jaggedness in edge or intersecting regions, and a combined video signal $DME_{ABC}$ indicating a three-dimensional video image obtained from the combination of three images A, B, and C is output from the present apparatus.

According to the video signal combining method, the order of arrangement in the depth direction among the images is decided for each pixel from the depth signal of at least three video signals input.

Next, the video signals are sequentially combined by this decided order of arrangement. In this way, a smooth combined image without the jaggedness in the edge or intersecting regions is obtained.

As explained above, in at least preferred embodiments of the present invention, a smooth edge and intersecting region can be obtained where three or more video signals are combined, and in addition, a video image in which an unnatural picture is not seen is obtained.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for combining input video signals, each video signal having an associated depth information signal, said apparatus comprising:

(i) fist combining means for combining a first video signal with a second video signal and outputting an intermediate combined video signal;

(ii) second combining means for combining said intermediate combined video signal supplied form said first combining means with a third video signal and outputting an output combined video signal;

(iii) discriminating means for discriminating a depth order of said input video signals in accordance with said depth information signals; and (iv) switching means connected to said discriminating means and supplied with said input video signals for switching one of said input video signals to form said first video signal, for switching another of said input video signals to form said second video signal and for switching still another of said input video signals to form said third video signal respectively, said switching performed according to a discrimination result of said discriminating means, so that said input video signals are switched to form said first video signal, said second video signal and said third video signal in depth order.

2. Apparatus as claimed in claim 1, wherein each input video signal has an associated key signal for use during combination of that video signal with another video signal.

3. Apparatus as claimed in claim 1, wherein said discriminating means produces a discrimination result for each pixel of said input video signals to be combined.

4. Apparatus as claimed in claim 1, wherein said depth information signals indicate a depth that may vary within an image.

* * * * *

UNITED STATES PATENT AND TRADEMARK OFFICE
CERTIFICATE OF CORRECTION

PATENT NO. : 5,353,068
DATED : October 4, 1994
INVENTOR(S) : Katsuakira Moriwake It is certified that error appears in the above-indentified patent and that said Letters Patent is hereby corrected as shown below:

On the title, item [63],
In <u>References Cited</u>, Patent No. 4,774,583, change "Keller" to --Kellar--

Col. 1, line 35, change "non jagged" to --nonjagged--
      line 49, change "$V_1$" to --$V_A$--
      line 52, change "Following" to --following--
Col. 2, line 11, change "Function" to --function--
      line 12, change "From" to --from--
      line 20, change "For" to --for--
Col. 3, line 23, after "order" delete "."
      line 30, change "First" to --first--
Col. 4, line 47, after "second" insert --2--
      line 49, change "i" to --1--
      line 61, change "Order Of" to --order of--
      line 62, change "From" to --from--

UNITED STATES PATENT AND TRADEMARK OFFICE
CERTIFICATE OF CORRECTION

PATENT NO. : 5,353,068
DATED : October 4, 1994
INVENTOR(S) : Katsuakira Moriwake It is certified that error appears in the above-indentified patent and that said Letters Patent is hereby corrected as shown below:

```
Col. 5, line  7, change "First" to --first--
        line 11, change "Order" to --order--
        line 25, change "." to --,--
        line 58, change "." to --,--
Col. 6, line  3, change "Z_a" to --Z_A--
        line  5, change "ape" to --are--
        line 23, change "First" to --first--
        line 65, change "Judgement" to --judgement--

Col. 8, line 13, change "fist" to --first--
        line 17, change "form" to --from--
```

Signed and Sealed this

Fourth Day of July, 1995

Attest:

BRUCE LEHMAN

Attesting Officer    Commissioner of Patents and Trademarks